(12) United States Patent
Price

(10) Patent No.: US 7,720,792 B2
(45) Date of Patent: May 18, 2010

(54) AUTOMATIC STOP WORD IDENTIFICATION AND COMPENSATION

(75) Inventor: Robert Jenson Price, Ashburn, VA (US)

(73) Assignee: Content Analyst Company, LLC, Reston, VA (US)

( * ) Notice: Subject to any disclaimer, the term of this patent is extended or adjusted under 35 U.S.C. 154(b) by 238 days.

(21) Appl. No.: 11/348,303

(22) Filed: Feb. 7, 2006

(65) Prior Publication Data

US 2006/0224572 A1    Oct. 5, 2006

Related U.S. Application Data

(60) Provisional application No. 60/668,070, filed on Apr. 5, 2005.

(51) Int. Cl.
*G06F 7/00* (2006.01)
*G06F 17/00* (2006.01)
*G06F 17/30* (2006.01)

(52) U.S. Cl. ............... 707/5; 707/101; 707/E17.002

(58) Field of Classification Search ............ 707/5, 707/101, E17.002
See application file for complete search history.

(56) References Cited

U.S. PATENT DOCUMENTS

| 4,839,853 | A | 6/1989 | Deerwester et al. |
| 5,301,109 | A | 4/1994 | Landauer et al. |
| 6,615,208 | B1 | 9/2003 | Behrens et al. |
| 7,158,983 | B2 * | 1/2007 | Willse et al. ............... 707/101 |
| 7,356,527 | B2 * | 4/2008 | Carmel et al. ............... 707/5 |

OTHER PUBLICATIONS

Chisholm et al, "New Term Weighting Formulas for the Vector Space Method in Information Retrieval", Mar. 1999.*
W. John Wilbur et al, "An Analysis of Statistical Term Strength and its Use in the Indexing and Retrieval of Molecular Biology Texts", 1996, Comput. Biol. Med. vol. 26, No. 3, pp. 209-222.*
Kwok, K.L., "Experiments with a Component Theory of Probabilistic Information Retrieval Based on Single Terms as Document Components", 1990, ACM.*
Teuvo Kohonen, "Self-Organizing Maps," Third Edition, Springer-Verlag Berlin Heidelberg, New York, pp. 105-115 and 191-194.
P.F. Brown, et al., "The Mathematics of Statistical Machine Translation: Parameter Estimation," 19 Computational Linguistics 263 (1993).

(Continued)

*Primary Examiner*—Mohammad Ali
*Assistant Examiner*—Brannon W Smith
(74) *Attorney, Agent, or Firm*—Sterne, Kessler, Goldstein and Fox PLLC

(57) ABSTRACT

Disclosed are methods and computer program products for automatically identifying and compensating for stop words in a text processing system. This automatic stop word compensation allows such operations as performing queries on an abstract mathematical space built using all words from all texts, with the ability to compensate for the skew that the inclusion of the stop words may have introduced into the space. Documents are represented by document vectors in the abstract mathematical space. To compensate for stop words, a weight function is applied to a predetermined component of the document vectors associated with frequently occurring word(s) contained in the documents. The weight function may be applied dynamically during query processing. Alternatively, the weight function may be applied statically to all document vectors.

7 Claims, 4 Drawing Sheets

OTHER PUBLICATIONS

Klebanov, B., and Wiemer-Hastings, P., 2002, "Using LSA for Pronominal Anaphora Resolution," in Gelbukh, A. (ed.) Computational Linguistics and Intelligent Text Processing, LNCS 2276, Springer Verlag, pp. 197-199.

Deerwester, S., et al., "Indexing by Latent Semantic Analysis," Journal of the American Society for Information Science, 41(6), pp. 391-407, Oct. 1990.

Ding, C., A Similarity-based Probability Model for Latent Semantic Indexing, Proceedings of the 22nd Annual SIGIR Conference, Berkeley, Calif., Aug. 1999.

Marchisio, G., and Liang, J., "Experiments in Trilingual Cross-language Information Retrieval," Proceedings, 2001 Symposium on Document Image Understanding Technology, Columbia, MD, 2001, pp. 169-178.

Hoffman, T., "Probabilistic Latent Semantic Indexing," Proceedings of the 22nd Annual SIGIR Conference, Berkeley, CA, 1999, pp. 50-57.

Kolda, T., and O.Leary, D., "A Semidiscrete Matrix Decomposition for Latent Semantic Indexing in Information Retrieval," ACM Transactions on Information Systems, vol. 16, Issue 4 (Oct. 1998), pp. 322-346.

Landauer, T., et al., in "Learning Human-Like Knowledge by Singular Value Decomposition: A Progress Report," in M.I. Jordan, MJ. Kearns and S.A. Solla (Eds.), Advances in Neural Information Processing Systems 10, Cambridge: MIT Press, pp. 45-51 (1998).

William H. Press et al., "Numerical Recipes," The Art of Scientific Computing, Chapter 2, pp. 52-64, Cambridge University Press, 1986.

D. Arnold et al., "Machine Translation," Chapter 6, pp. 111-128, Blackwell Publishers, Cambridge, MA, 1994.

Teuvo Kohonen, "Self-Organizing Maps," Third Edition, Springer-Verlag Berlin Heidelberg, New York, pp. 105-115 and 191-194, (Published:2001).

Susan T. Dumais, "Latent Semantic Analysis," Annual Review of Information Science and Technology, vol. 38, Information Today, Inc., Medford, New Jersey, 2004, pp. 189-230.

* cited by examiner

AUTOMATIC STOP WORD IDENTIFICATION AND COMPENSATION

CROSS REFERENCE TO RELATED APPLICATIONS

This application claims benefit under 35 U.S.C. §119(e) to U.S. Provisional Patent Application 60/668,070, entitled "Automatic Stop Word Compensation in Latent Semantic Indexing Spaces," to Price, filed on Apr. 5, 2005, the entirety of which is hereby incorporated by reference as if fully set forth herein.

BACKGROUND

1. Field of the Invention

The present invention relates generally to information processing and data retrieval, and in particular to text processing systems.

2. Background

Text processing systems are often used to process the text of documents in a collection of documents. As is known in the art, the processing of the document text can be used to improve a user's ability to search and retrieve documents in a collection of documents that are most conceptually relevant to a search query performed by the user. U.S. Pat. No. 4,839,853 to Deerwester et al., for example, describes a text processing method in which words and phrases in a collection of documents are mapped into a Latent Semantic Indexing (LSI) space.

The concept of stop words naturally arises in text processing systems. Stop words are words that add little semantic value due to their commonness in the collection of documents. For normal English texts, stop words are the ubiquitous "the", "and", and similar words. In specialized domains, stop words can also include other words that are used so often that they add no value to the semantic content of the documents. For example, in a collection of Reuters news articles, each article will have the word "Reuters" in it. This word, in this context, can be treated as a stop word as it adds no meaning to the text of the article.

A typical text processing system requires a user to define the set of stop words that the system is to ignore. However, this is not the optimal method to determine stop words in a collection of documents. For example, the existence of polysemous words can potentially make the use of a list of stop words problematic. A polysemous word is a word that has multiple senses, such as the word "can." One sense of the word "can" is associated with an ability to do something, as in "she can read." Another sense of the word "can" is associated with a packaging device, such as "a can of beans." In many user queries, including the word "can" in a list of stop words would be fine. In a query of documents about shipping and packaging, however, the sense of the word "can" as a packaging device may be relevant to a user's query. By requiring a list of stop words, this potentially relevant sense of the polysemous word "can" may be eliminated from the user's query.

Given the foregoing, what is needed is a method and computer program product to automatically identify and compensate for stop words in text processing systems. Such a method and computer program product should not require a user to provide a list of stop words. In addition, such a method and computer program product should retain information about polysemous words that may be relevant in certain contexts. Moreover, such a method and computer program product should be language independent.

SUMMARY OF THE INVENTION

The present invention provides a method and computer program product for automatically identifying and compensating for stop words in a text processing system. This automatic stop word compensation allows such operations as performing queries on an abstract mathematical space (such as, an LSI space) built using all words from all texts, with the ability to compensate for the skew that the inclusion of stop words may have introduced into the space.

An embodiment of the present invention provides a computer-based method for automatically compensating for stop words contained in documents during a query of the documents. The method includes the following steps. An abstract mathematical space is generated based on documents included in a collection of documents, wherein each document has a representation in the abstract mathematical space. A user query is received. A representation of the user query is generated in the abstract mathematical space. A similarity is computed between the representation of the user query and the representation of each document, wherein computing a similarity between the representation of the user query and the representation of a first document in the collection of documents comprises applying a weighting function to a value associated with a frequently occurring word contained in the first document, thereby automatically compensating for the frequently occurring word contained in the first document. A result is displayed based on the similarity computations.

Another embodiment of the present invention provides a computer program product for automatically compensating for stop words contained in documents during a query of the documents. The computer program product includes a computer usable medium having computer readable program code means embodied in the medium for causing an application program to execute on an operating system of a computer. The computer readable program code means includes computer readable program code means.

A computer readable first program code includes means for generating an abstract mathematical space based on documents in a collection of documents, wherein each document has a representation in the abstract mathematical space. A computer readable second program code includes means for receiving a user query. A computer readable third program code includes means for generating a representation of the user query in the abstract mathematical space. A computer readable fourth program code includes means for computing a similarity between the representation of the user query and the representation of each document, wherein computing a similarity between the representation of the user query and the representation of a first document in the collection of documents comprises applying a weighting function to a value associated with a frequently occurring word contained in the first document, thereby automatically compensating for the frequently occurring word contained in the first document. A computer readable fifth program code includes means for displaying a result based on the similarity computations.

A further embodiment of the present invention provides a computer-based method for automatically identifying stop words contained in a document collection. The method includes the following steps. An abstract mathematical space is generated based on documents included in a collection of documents, wherein each unique term contained in the documents has a multi-dimensional representation in the abstract mathematical space. Stop words contained in the documents are identified based on a magnitude of a predetermined dimension of each multi-dimensional representation in the abstract mathematical space.

A still further embodiment of the present invention provides a computer program product for automatically identifying stop words contained in a document collection. The computer program product includes a computer usable medium having computer readable program code means embodied in the medium for causing an application program to execute on an operating system of a computer. The computer readable program code means includes: (i) a computer readable first program code means for generating an abstract mathematical space based on documents included in a collection of documents, wherein each unique term contained in the documents has a multi-dimensional representation in the abstract mathematical space; and (ii) a computer readable second program code means for identifying stop words contained in the documents based on a magnitude of a predetermined dimension of each multi-dimensional representation in the abstract mathematical space.

A method in accordance with an embodiment of the present invention may have several significant advantages. For example, a method in accordance with an embodiment of the present invention: (1) does not require a predefined stop word list, which allows for stop word compensation in document collections of any language or domain with no required training; (2) accounts for the influence of all stop words, not just those predefined by the user, (3) preserves the information and influence that stop words present to all areas of the abstract mathematical space (e.g., LSI space); (4) can be enabled or disabled at any time without requiring a rebuild of the abstract mathematical space (e.g., LSI space); and (5) does not eliminate information that would arise from pre-defined stop words that are actually significant in a document domain; e.g., the polysemous word "can" will retain its significance as a packaging device in a domain of packaging and shipping documents.

Further embodiments and features of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
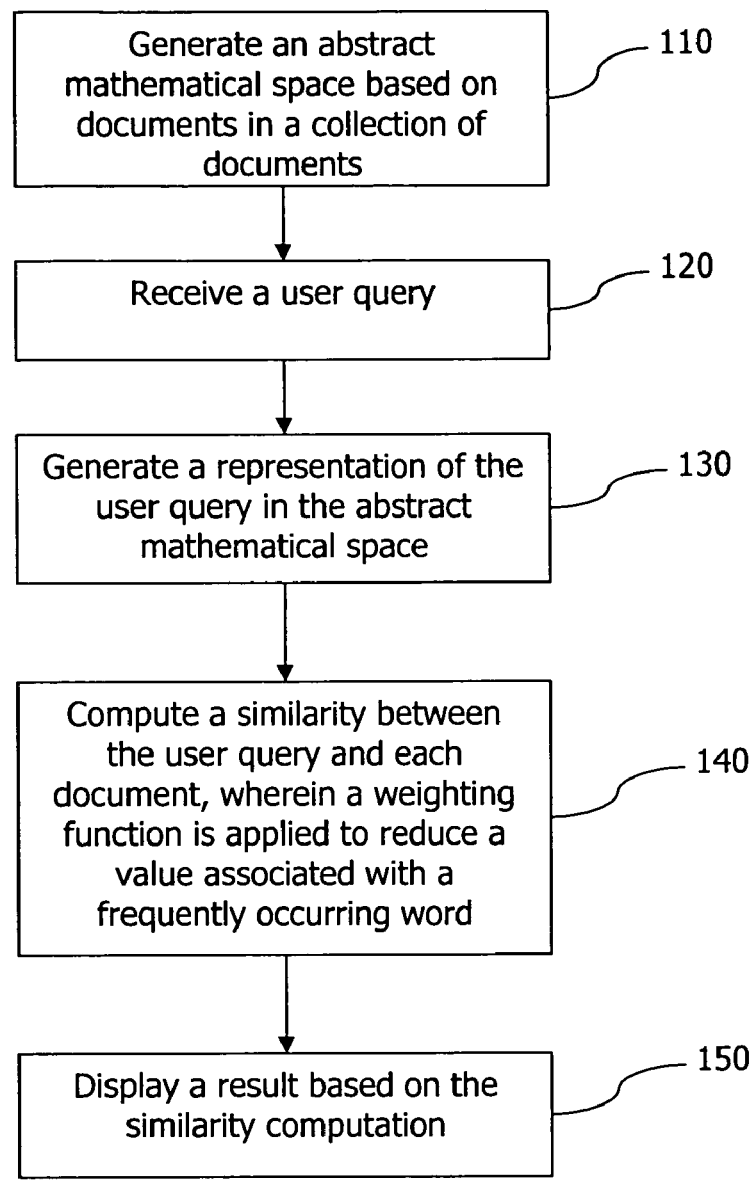
FIG. 1 is a flowchart illustrating a method for generating stop words for documents in a collection of documents in accordance with an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Introduction

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As is described in more detail herein, an embodiment of the present invention provides a method to automatically compensate for stop words in a text processing system, with no training or explicit support from any outside source. The automatic compensation for stop words is based on a weighting function being applied during a query operation. In an embodiment, the query operation is based on a conceptual similarity measurement using a Latent Semantic Indexing (LSI) technique. For example, a weighting function can be applied to a first computed dimension of an LSI conceptual similarity measurement. Embodiments of the present invention can be implemented by software, firmware, hardware, or a combination thereof.

Overview

FIG. 1 illustrates a flowchart 100 of an example method for automatically compensating for stop words of documents in a collection of documents. Flowchart 100 begins at a step 110, in which an abstract mathematical space is generated based on documents included in a collection of documents. Generation of the abstract mathematical space may include ancillary steps. For example, all the text in the documents may be pre-processed to identify terms and possible phrases. Techniques for pre-processing document text are well-known by persons skilled in the relevant art(s). For instance, a pre-processing technique can include, but is not limited to, identifying all words between punctuation marks or parenthetical remarks. As another example, a lexicon of terms (such as words or phrases) may be developed from the pre-processing. As is described below, the abstract mathematical space may be a multi-dimensional mathematical vector space, such as an LSI space.

In a step 120, a user query is received. For example, the user query may be a string of words.

In a step 130, a representation of the user query is generated in the abstract mathematical space. For example, the user query can be represented as a multi-dimensional vector. In an embodiment in which the abstract mathematical space is an LSI space, the user query can be represented as a pseudo-object in the LSI space. Techniques for generating pseudo-objects are known by persons skilled in the relevant art(s). For example, a method for generating pseudo-objects is described in the above-mentioned U.S. Pat. No. 4,839,853 ("the '853 patent"), the entirety of which is incorporated by reference herein.

In a step 140, a similarity is computed between the representation of the user query and the representation of each document. During the similarity computations, a weighting function is applied to reduce a value associated with a frequently occurring word or stop word. Applying a weighting function to this value automatically compensates for stop words. In an embodiment, this stop word compensation feature can be enabled and/or disabled by a user.

In an embodiment, the value may be a component of the representation of a document, such as a component of a multi-dimensional vector representation. In an embodiment in which the documents are represented in an LSI space, the component of the representation can be a first computed dimension of the document representation and the similarity computations can be cosine similarity measurements. As described in more detail below, a dominant concept of a document collection may be associated with the first computed dimension of an LSI representation of the documents. Furthermore, the dominant concept typically represents the most common words of the document collection, and these most common words are usually stop words. Consequently, applying a weighting function to the first computed dimension can automatically compensate for stop words of the document collection during a query operation. In an embodiment, a user can choose to turn off the stop word compensation feature for a particular query.

In a step 150, a result is displayed based on the similarity computations. In an embodiment, the result may be a list of documents returned based on the user query. In another embodiment, the result may be a list of stop words.

It is to be appreciated that the example method illustrated by flowchart 100 is presented for illustrative purposes only, and not limitation. For example, it is to be appreciated that stop words in a particular LSI space may be determined to have a dominant role in other dimensions which may similarly have weights applied to manage their influence. And, in general, the concepts of any particular dimension or set of dimensions may be compensated for by either reducing or enlarging their impact on query operations by such weighting functions.

In addition, while the method illustrated by flowchart 100 indicates that the weighting function is applied in a dynamic manner (i.e., only during a query operation), it is to be appreciated that the weighting function can be applied in a static manner as well. For example, in an embodiment, a weighting function can be applied to the vector element in the first computed dimension of each vector, thereby permanently altering all the vectors in the abstract mathematical space. In another embodiment, a weighting function is applied to each vector that is associated with a stop word, thereby permanently altering only those vectors that are associated with stop words.

As mentioned above and described in the next section, in an embodiment, the abstract mathematical space generated in step 110 is an LSI space and the similarity computations in step 140 are cosine similarities between representations in the LSI space. However, as will be apparent to a person skilled in the relevant art(s) from the description contained herein, other techniques can be used to measure a conceptual similarity between any two representations without deviating from the scope and spirit of the present invention.

Examples of other techniques that can be used to measure a conceptual similarity between a document and a user query in accordance with embodiments of the present invention can include, but are not limited to, the following: (i) probabilistic LSI (see, e.g., Hoffinan, T., "Probabilistic Latent Semantic Indexing," Proceedings of the 22nd Annual SIGIR Conference, Berkeley, Calif., 1999, pp. 50-57); (ii) latent regression analysis (see, e.g., Marchisio, G., and Liang, J., "Experiments in Trilingual Cross-language Information Retrieval," Proceedings, 2001 Symposium on Document Image Understanding Technology, Columbia, Md., 2001, pp. 169-178); (iii) LSI using semi-discrete decomposition (see, e.g., Kolda, T., and O. Leary, D., "A Semidiscrete Matrix Decomposition for Latent Semantic Indexing Information Retrieval," ACM Transactions on Information Systems, Volume 16 , Issue 4 (October 1998), pp. 322 - 346); and (iv) self-organizing maps (see, e.g., Kohonen, T., "Self-Organizing Maps," 3rd Edition, Springer-Verlag, Berlin, 2001). Each of the foregoing cited references is incorporated by reference in its entirety herein.

Latent Semantic Indexing (LSI)

Before discussing embodiments of the present invention, it is helpful to present a motivating example of LSI, which can also be found in the '853 patent mentioned above. This motivating example is used to explain the generation of an LSI space and the reduction of that space using a technique called Singular Value Decomposition.(SVD). From this motivating example, a general overview of the mathematical structure of the LSI model is given, including a mathematical description of how to measure the conceptual similarity between objects represented in the LSI space.

Illustrative Example of the LSI Method

The contents of Table 1 are used to illustrate how semantic structure analysis works and to point out the differences between this method and conventional keyword matching.

TABLE 1

Document Set Based on Titles c1: Human machine interface for Lab ABC computer applications
c2: A survey of user opinion of computer system response time
c3: The EPS user interface management system
c4: Systems and human systems engineering testing of EPS-2
c5: Relation of user-perceived response time to error measurement
m1: The generation of random, binary, unordered trees
m2: The intersection graph of paths in trees
m3: Graph minors IV: Widths of trees and well-quasi-ordering
m4: Graph minors: A survey In this example, a file of text objects consists of nine titles of technical documents with titles c1-c5 concerned with human/computer interaction and titles m1-m4 concerned with mathematical graph theory. Using conventional keyword retrieval, if a user requested papers dealing with "human computer interaction," titles c1, c2, and c4 would be returned, since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix for the 9 technical document titles. Each cell entry, (i,j), is the frequency of occurrence of term i in document j. This basic term-by-document matrix or a mathematical transformation thereof is used as input to the statistical procedure described below.

TABLE 2

| TERMS | DOCUMENTS | | | | | | | | |
|---|---|---|---|---|---|---|---|---|---|
| | c1 | c2 | c3 | c4 | c5 | m1 | m2 | M3 | m4 |
| Human | 1 | 0 | 0 | 1 | 0 | 0 | 0 | 0 | 0 |
| interface | 1 | 0 | 1 | 0 | 0 | 0 | 0 | 0 | 0 |
| computer | 1 | 1 | 0 | 0 | 0 | 0 | 0 | 0 | 0 |
| User | 0 | 1 | 1 | 0 | 1 | 0 | 0 | 0 | 0 |
| System | 0 | 1 | 1 | 2 | 0 | 0 | 0 | 0 | 0 |

TABLE 2-continued

| TERMS | DOCUMENTS | | | | | | | | |
|---|---|---|---|---|---|---|---|---|---|
|  | c1 | c2 | c3 | c4 | c5 | m1 | m2 | M3 | m4 |
| response | 0 | 1 | 0 | 0 | 1 | 0 | 0 | 0 | 0 |
| Time | 0 | 1 | 0 | 0 | 1 | 0 | 0 | 0 | 0 |
| EPS | 0 | 0 | 1 | 1 | 0 | 0 | 0 | 0 | 0 |
| Survey | 0 | 1 | 0 | 0 | 0 | 0 | 0 | 0 | 1 |
| Tree | 0 | 0 | 0 | 0 | 0 | 1 | 1 | 1 | 0 |
| Graph | 0 | 0 | 0 | 0 | 0 | 0 | 1 | 1 | 1 |
| Minor | 0 | 0 | 0 | 0 | 0 | 0 | 0 | 1 | 1 |

Figure 2:
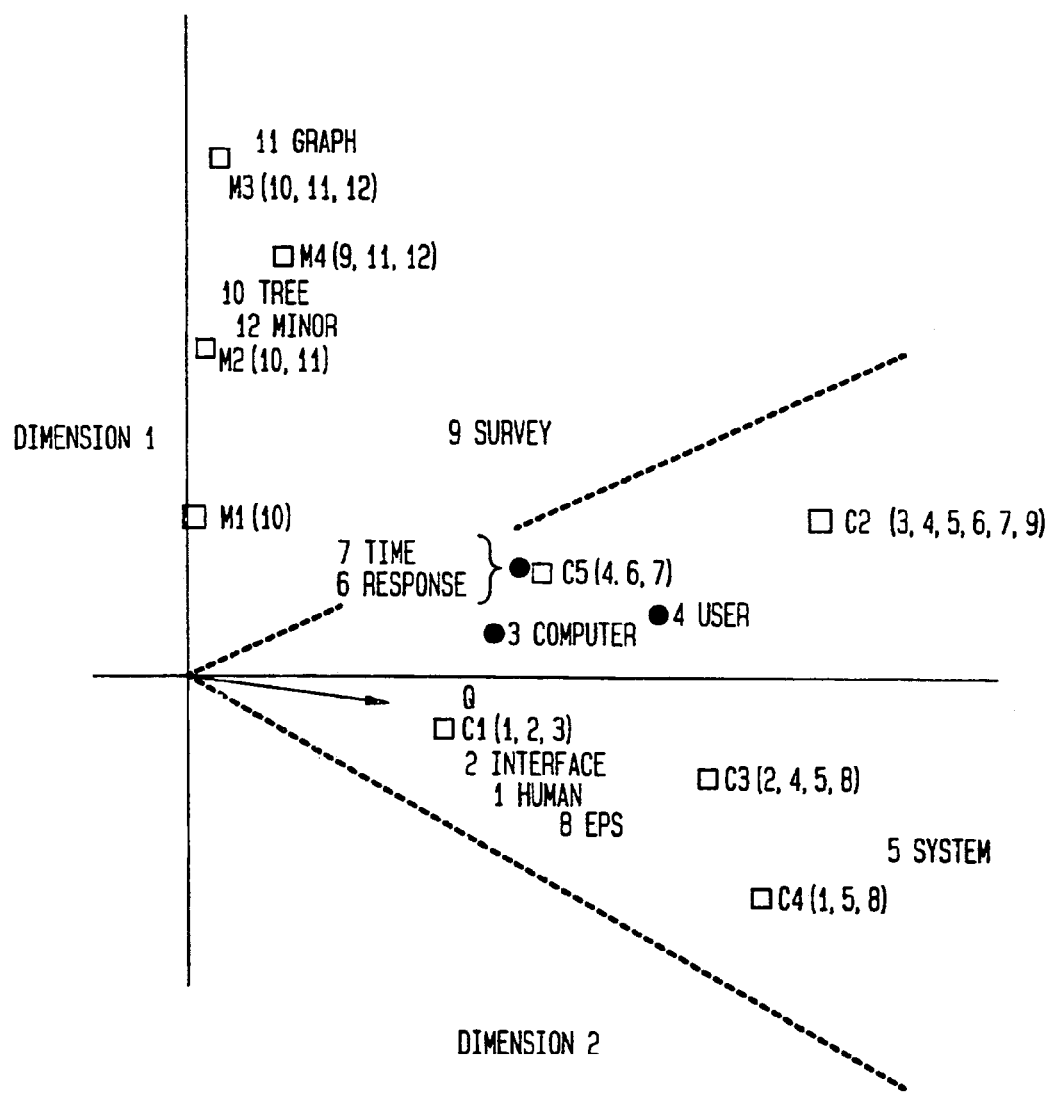
FIG. 2 is a plot of "term" coordinates and "document" coordinates based on a two-dimensional singular value decomposition of an original "term-by-document" matrix.

For this example the documents and terms have been carefully selected to yield a good approximation in just two dimensions for expository purposes. FIG. 2 is a two-dimensional graphical representation of the two largest dimensions resulting from the mathematical process of a singular value decomposition. Both document titles and the terms used in them are placed into the same representation space. Terms are shown as circles and labeled by number. Document titles are represented by squares with the numbers of constituent terms indicated parenthetically. The angle between two object (term or document) vectors describes their computed similarity. In this representation, the two types of documents form two distinct groups: all the mathematical graph theory titles occupy the same region in space (basically along Dimension 1 of FIG. 2); whereas a quite distinct group is formed for human/computer interaction titles (essentially along Dimension 2 of FIG. 2).

To respond to a user query about "human computer interaction," the query is first folded into this two-dimensional space using those query terms that occur in the space (namely, "human" and "computer"). The query vector is located in the direction of the weighted average of these constituent terms, and is denoted by a directional arrow labeled "Q" in FIG. 2. A measure of closeness or similarity is the angle between the query vector and any given term or document vector. In FIG. 2 the cosine between the query vector and each c1-c5 titles is greater than 0.90; the angle corresponding to the cosine value of 0.90 with the query is shown by the dashed lines in FIG. 2. With this technique, documents c3 and c5 would be returned as matches to the user query, even though they share no common terms with the query. This is because the latent semantic structure (represented in FIG. 2) fits the overall pattern of term usage across documents.

Description of Singular Value Decomposition

To obtain the data to plot FIG. 2, the "term-by-document" matrix of Table 2 is decomposed using singular value decomposition (SVD). A reduced SVD is employed to approximate the original matrix in terms of a much smaller number of orthogonal dimensions. The reduced dimensional matrices are used for retrieval; these describe major associational structures in the term-document matrix but ignore small variations in word usage. The number of dimensions to represent adequately a particular domain is largely an empirical matter. If the number of dimensions is too large, random noise or variations in word usage will be modeled. If the number of dimensions is too small, significant semantic content will remain uncaptured. For diverse information sources, 100 or more dimensions may be needed.

To illustrate the decomposition technique, the tern-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} = TERM_{t,k} DIAGONAL_{k,k} DOCUMENT_{k,d}^T$$

where Y is the original t-by-d matrix, TERM is the t-by-k matrix that has unit-length orthogonal columns, DOCUMENT$^T$ is the transpose of the d-by-k DOCUMENT matrix with unit-length orthogonal columns, and DIAGONAL is the k-by-k diagonal matrix of singular values typically ordered by magnitude, largest to smallest.

The dimensionality of the solution, denoted k, is the rank of the t-by-d matrix, that is, k≦min(t,d). Table 3, Table 4, and Table 5 below show the TERM and DOCUMENT matrices and the diagonal elements of the DIAGONAL matrix, respectively, as found via SVD.

TABLE 3

TERM MATRIX (12 terms by 9 dimensions)

| Human | 0.22 | −0.11 | 0.29 | −0.41 | −0.11 | −0.34 | −.52 | −0.06 | −0.41 |
|---|---|---|---|---|---|---|---|---|---|
| Interface | 0.20 | −0.07 | 0.14 | −0.55 | 0.28 | 0.50 | −0.07 | −0.01 | −0.11 |
| computer | 0.24 | 0.04 | −0.16 | −0.59 | −0.11 | −0.25 | −0.30 | 0.06 | 0.49 |
| User | 0.40 | 0.06 | −0.34 | 0.10 | 0.33 | 0.38 | 0.00 | 0.00 | 0.01 |
| System | 0.64 | −0.17 | 0.36 | 0.33 | −0.16 | −0.21 | −0.16 | 0.03 | 0.27 |
| Response | 0.26 | 0.11 | −0.42 | 0.07 | 0.08 | −0.17 | 0.28 | −0.02 | −0.05 |
| Time | 0.26 | 0.11 | −0.42 | 0.07 | 0.08 | −0.17 | 0.28 | −0.02 | −0.05 |
| EPS | 0.30 | −0.14 | 0.33 | 0.19 | 0.11 | 0.27 | 0.03 | −0.02 | −0.16 |
| Survey | 0.20 | 0.27 | −0.18 | −0.03 | −0.54 | 0.08 | −0.47 | −0.04 | −0.58 |
| Tree | 0.01 | 0.49 | 0.23 | 0.02 | 0.59 | −0.39 | −0.29 | 0.25 | −0.22 |
| Graph | 0.04 | 0.62 | 0.22 | 0.00 | −0.07 | 0.11 | 0.16 | −0.68 | 0.23 |
| Minor | 0.03 | 0.45 | 0.14 | −0.01 | −0.30 | 0.28 | 0.34 | 0.68 | 0.18 |

TABLE 4

DOCUMENT MATRIX (9 documents by 9 dimensions)

| c1 | 0.20 | −0.06 | 0.11 | −0.95 | 0.04 | −0.08 | 0.18 | −0.01 | −0.06 |
|---|---|---|---|---|---|---|---|---|---|
| c2 | 0.60 | 0.16 | −0.50 | −0.03 | −0.21 | −0.02 | −0.43 | 0.05 | 0.24 |
| c3 | 0.46 | −0.13 | 0.21 | 0.04 | 0.38 | 0.07 | −0.24 | 0.01 | 0.02 |
| c4 | 0.54 | −0.23 | 0.57 | 0.27 | −0.20 | −0.04 | 0.26 | −0.02 | −0.08 |
| c5 | 0.28 | 0.11 | −0.50 | 0.15 | 0.33 | 0.03 | 0.67 | −0.06 | −0.26 |
| m1 | 0.00 | 0.19 | 0.10 | 0.02 | 0.39 | −0.30 | −0.34 | 0.45 | −0.62 |
| m2 | 0.01 | 0.44 | 0.19 | 0.02 | 0.35 | −0.21 | −0.15 | −0.76 | 0.02 |
| m3 | 0.02 | 0.62 | 0.25 | 0.01 | 0.15 | 0.00 | 0.25 | 0.45 | 0.52 |
| m4 | 0.08 | 0.53 | 0.08 | −0.02 | −0.60 | 0.36 | 0.04 | −0.07 | −0.45 |

TABLE 5

DIAGONAL (9 singular values)

| 3.34 | 2.54 | 2.35 | 1.64 | 1.50 | 1.31 | 0.84 | 0.56 | 0.36 |
|---|---|---|---|---|---|---|---|---|

As alluded to earlier, data to plot FIG. 2 was obtained by presuming that two dimensions are sufficient to capture the major associational structure of the t-by-d matrix, that is, k is set to two in the expression for Yt,d, yielding an approximation of the original matrix. Only the first two columns of the TERM and DOCUMENT matrices are considered with the remaining columns being ignored. Thus, the term data point corresponding to "human" in FIG. 2 is plotted with coordinates (0.22,−0.11), which are extracted from the first row and the two left-most columns of the TERM matrix. Similarly, the document data point corresponding to title m1 has coordinates (0.00,0.19), coming from row six and the two left-most columns of the DOCUMENT matrix. Finally, the Q vector is located from the weighted average of the terms "human" and "computer" appearing in the query. A method to compute the weighted average will be presented below.

General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y_0 = T_0 S_0 D_0^T \qquad (1)$$

such that $T_0$ and $D_0$ have unit-length orthogonal columns (i.e. $T_0^T T_0 = I$; $D_0^T D_0 = I$) and $S_0$ is diagonal. This is called the singular value decomposition (SVD) of Y. A procedure for SVD is described in the text "Numerical Recipes," by Press, Flannery, Teukolsky and Vetterling, 1986, Cambridge University Press, Cambridge, England, the entirety of which is incorporated by reference herein. $T_0$ and $D_0$ are the matrices of left and right singular vectors and $S_0$ is the diagonal matrix of singular values. By convention, the diagonal elements of $S_0$ are ordered in decreasing magnitude.

With SVD, it is possible to devise a simple strategy for an optimal approximation to Y using smaller matrices. The k largest singular values and their associated columns in $T_0$ and $D_0$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Since zeros were introduced into $S_0$, the representation of $S_0$ can be simplified by deleting the rows and columns having these zeros to obtain a new diagonal matrix S, and then deleting the corresponding columns of $T_0$ and $D_0$ to define new matrices T and D, respectively. The result is a reduced model such that $$Y_R = TSD^T \qquad (2)$$

The value of k is chosen for each application; it is generally such that k≧100 for collections of 1000-3000 data objects.

Example Similarity Comparisons

For discussion purposes, it is useful to interpret the SVD geometrically. The rows of the reduced matrices T and D may be taken as vectors representing the terms and documents, respectively, in a k-dimensional space. These vectors then enable the mathematical comparisons between the terms or documents represented in this space. Typical comparisons between two entities involve a dot product, cosine or other comparison between points or vectors in the space or as scaled by a function of the singular values of S. For example, if $d_1$ and $d_2$ respectively represent vectors of documents in the D matrix, then the similarity between the two vectors (and, consequently, the similarity between the two documents) can be computed as any of: (i) $d_1 \cdot d_2$, a simple dot product; (ii) $(d_1 \cdot d_2)/(\|d_1\| \times \|d_2\|)$, a simple cosine; (iii) $(d_1 S) \cdot (d_2 S)$, a scaled dot product; and (iv) $(d_1 S \cdot d_2 S)/(\|d_1 S\| \times \|d_2 S\|)$, a scaled cosine.

Mathematically, the similarity between representation $d_1$ and $d_2$ can be represented as $\langle d_1 | d_2 \rangle$ Then, for example, if the simple cosine from item (ii) above is used to compute the similarity between two vectors, $\langle d_1 | d_2 \rangle$ can be represented in the following well-known manner:

$$\langle d_1 | d_2 \rangle = \frac{d_1 \cdot d_2}{\|d_1\| \|d_2\|} = \frac{1}{\|d_1\| \|d_2\|} \left[ \sum_{i=1}^{k} d_{1,i} \cdot d_{2,i} \right], \qquad (3)$$

where $d_{1,i}$ and $d_{2,i}$ are the components of the representations $d_1$ and $d_2$, respectively.

Representations of Pseudo-Objects

The previous results show how it is possible to compute comparisons between the various objects associated with the rows or columns of Y. It is important in information retrieval applications to compute similar comparison quantities for objects such as queries that do not appear explicitly in Y. For example, it is necessary to be able to take a completely novel query, find a location in the k-dimensional latent semantic space for it, and then evaluate its cosine with respect to terms or objects in the space. Another example would be trying, after-the-fact, to find representations for documents that did not appear in the original space. The new objects for both these examples are equivalent to objects in the matrix Y in that they may be represented as vectors of terms. For this reason they are called pseudo-documents specifically or pseudo-objects generically. In order to compare pseudo-documents to other documents, the starting point is defining a pseudo-document vector, designated $Y_q$. Then a representation $D_q$ is derived such that $D_q$ can be used just like a row of D in the comparison relationships described in the foregoing sections. The process of generating a pseudo-object vector of a (user) query or a document is often referred to as "folding in" the (user) query or the document into the LSI space.

One criterion for such a derivation is that the insertion of a real document $Y_i$ should give $D_i$ when the model is ideal (i.e., $Y = Y_R$). With this constraint, $$Y_q = TSD_q^T$$

or, since $T^T T$ equals the identity matrix, $$D_q^T = S^{-1} T^T Y_q$$

or, finally, $$D_q = Y_q^T T S^{-1} \qquad (4)$$

Thus, with appropriate rescaling of the axes, this amounts to placing the pseudo-object at the vector sum of its corresponding term points. A similarity comparison between a document and a pseudo-object can be carried out in a similar manner to that described above. For example, if a cosine similarity is used, the conceptual similarity computation is carried out in accordance with equation (3). In particular, the cosine similarity between d1 (the representation of a document) and q (the pseudo-object representation of a (user) query) can be computed as follows:

$$\langle d_1 | q \rangle = \frac{d_1 \cdot q}{\|d_1\| \|q\|} = \frac{1}{\|d_1\| \|q\|} \left[ \sum_{i=1}^{k} d_{1,i} \cdot q_i \right]. \qquad (5)$$

A method that automatically compensates for stop words can be developed from the LSI techniques described above.

LSI and Stop Word Compensation

As mentioned above, an embodiment of the present invention uses an LSI technique to compensate for stop words included in documents in a collection of documents. That is, in an embodiment an LSI space is generated as the abstract mathematical space recited above with respect to flowchart 100 of FIG. 1. This embodiment is based on an empirical observation of LSI computation algorithms as described below.

If words and phrases of documents in a collection of documents are mapped into an LSI space, an LSI computation algorithm naturally groups stop words into a consistent subspace within the LSI space. It is commonly held that the dominant "concept" of a set of documents used to create an LSI space is associated with the spatial data of the first computed dimension of the LSI space. It also seems apparent that the words that appear most frequently in a collection of documents largely define the dominant concept of these documents. As stop words are typically those that appear most frequently, it can be inferred that the words with the largest vector elements in the first computed dimension are highly likely to be stop words with respect to the initial document collection. Empirical observation has validated this conclusion. This empirical discovery can be used to enable compensation of stop words by reducing the weight of a first computed dimension in certain equations used in searches of LSI spaces.

During a search of an LSI space, a similarity is computed between the representation of a document and the representation of a (user) query, as described above. Mathematically, this similarity computation can be represented generally as ⟨d|q⟩, where d is the LSI representation of the document and q is the LSI representation of the (user) query. If a simple cosine similarity is used to compute this similarity, ⟨d|q⟩ may be computed by using equation (5) from above.

However, in accordance with an embodiment of the present invention, a weighting function is applied to a value associated with a frequently occurring word or stop word, as recited above with respect to step 140 of FIG. 1. As mentioned above, this value may be associated with a first computed dimension of an LSI vector representation of a document. In other words, in an embodiment, a weighting function is applied to a first computed dimension of an LSI representation of a document during the similarity computation of step 140, thereby automatically compensating for stop words. Mathematically, the application of this weighting function can be represented as follows:

$$\langle d \mid q \rangle = \frac{1}{\|d\|\|q\|}\left[w(d_1 \cdot q_1) + \sum_{i=2}^{k} d_i \cdot q_i\right], \quad (6)$$

wherein w is a weighting function, $d_i$ are the components of the LSI vector representation d, and $q_i$ are the components of the LSI vector representation q. In an embodiment, w is equal to scaling the value by a factor of ½.

As mentioned above, the first computed dimension of an LSI space is associated with stop words contained in a collection of documents. As shown in equation (6), the first computed dimension may be reduced by a weighting function w during a query operation. By reducing the first computed dimension during a query of that space, an algorithm in accordance with this embodiment automatically compensates for stop words. In this way, stop words compensation in accordance with an embodiment of the present invention does not require the use of a pre-existing list of stop words. In fact, a stop word compensation algorithm in accordance with this embodiment is language independent.

Moreover, because the stop words are automatically compensated for, certain potentially relevant information will not be lost. As mentioned above, the word "can" may be included in a list of stop words. However, because the word "can" is polysemous (i.e., it has multiple senses) there are instances in which "can" should not be considered a stop word. In a query of packaging and shipping documents, the sense of the word "can" as a shipping device may be of relevance. Because embodiments of the present invention automatically compensate for stop words, and do not relying on a pre-existing list of stop words, this sense of the word "can" would be retained during such a query.

In an embodiment, a user can choose to turn the stop word compensation feature ON or OFF. Because the stop word compensation is performed dynamically (i.e., during a query operation), the LSI space does not have to be re-constructed each time the stop word compensation feature is turned ON and/or OFF by a user.

In another embodiment, a weighting function may be applied to any particular dimension or set of dimensions to either reduce or enlarge an associated value or set of values. For example, equation (6) may be modified so that weighting function w is applied to the second dimension, as follows:

$$\langle d \mid q \rangle = \frac{1}{\|d\|\|q\|}\left[(d_1 \cdot q_1) + w(d_2 \cdot q_2) + \sum_{i=3}^{k} d_i \cdot q_i\right]. \quad (7)$$

In another example, weighting function w may be applied to the combination of the first and second dimensions, as follows:

$$\langle d \mid q \rangle = \frac{1}{\|d\|\|q\|}\left[w((d_1 \cdot q_1) + (d_2 \cdot q_2)) + \sum_{i=3}^{k} d_i \cdot q_i\right]. \quad (8)$$

In a further embodiment, a weighting function is applied in a static manner. For example, in an embodiment, a weighting function is applied to the vector element in the first computed dimension of each vector, thereby permanently altering all the vectors in the abstract mathematical space. Mathematically, the application of a weighting function to the first computed dimension of a vector d can be represented as $$d=(wd_1, d_2, \ldots d_k) \quad (9)$$

where the di are the components of the vector d.

In a still further embodiment, the stop words of a document collection in an LSI space can be identified by an examination of the term vector representations. Since the influence of stop words in a document collection appears most dominantly in the first dimension, the stop words of a collection can be found by finding those terms with the largest magnitude value in the first dimension of the term vector representations.

Figure 3:
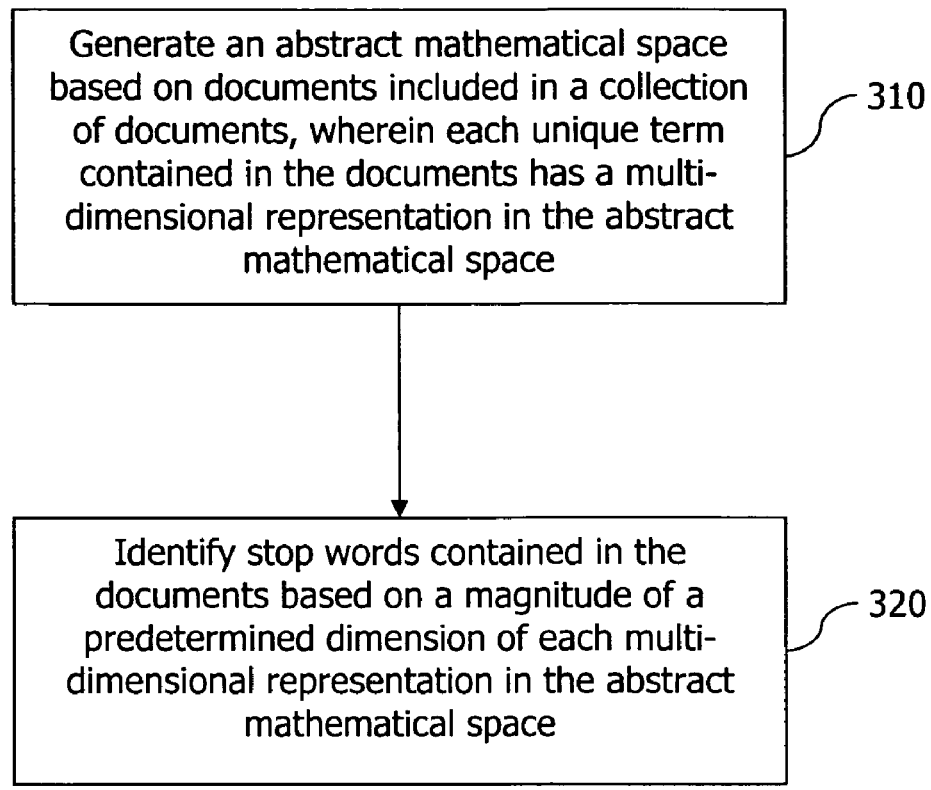
FIG. 3 is a flowchart illustrating a method for identifying stop words contain in a document collection in accordance with an embodiment of the present invention.

For example, FIG. 3 illustrates a flowchart depicting a computer-based method 300 for automatically identifying stop words contained in a document collection. Method 300 begins at a step 310 in which an abstract mathematical space is generated based on documents included in a collection of documents, wherein each unique term contained in the documents has a multi-dimensional representation in the abstract mathematical space. For instance, the abstract mathematical space can be a LSI space.

In a step 320, stop words contained in the documents are identified based on a magnitude of a predetermined dimension of each multi-dimensional representation in the abstract mathematical space. For example, the predetermined dimension may be the first computed dimension of each multi-dimensional representation.

Example Computer System Implementation

Figure 4:
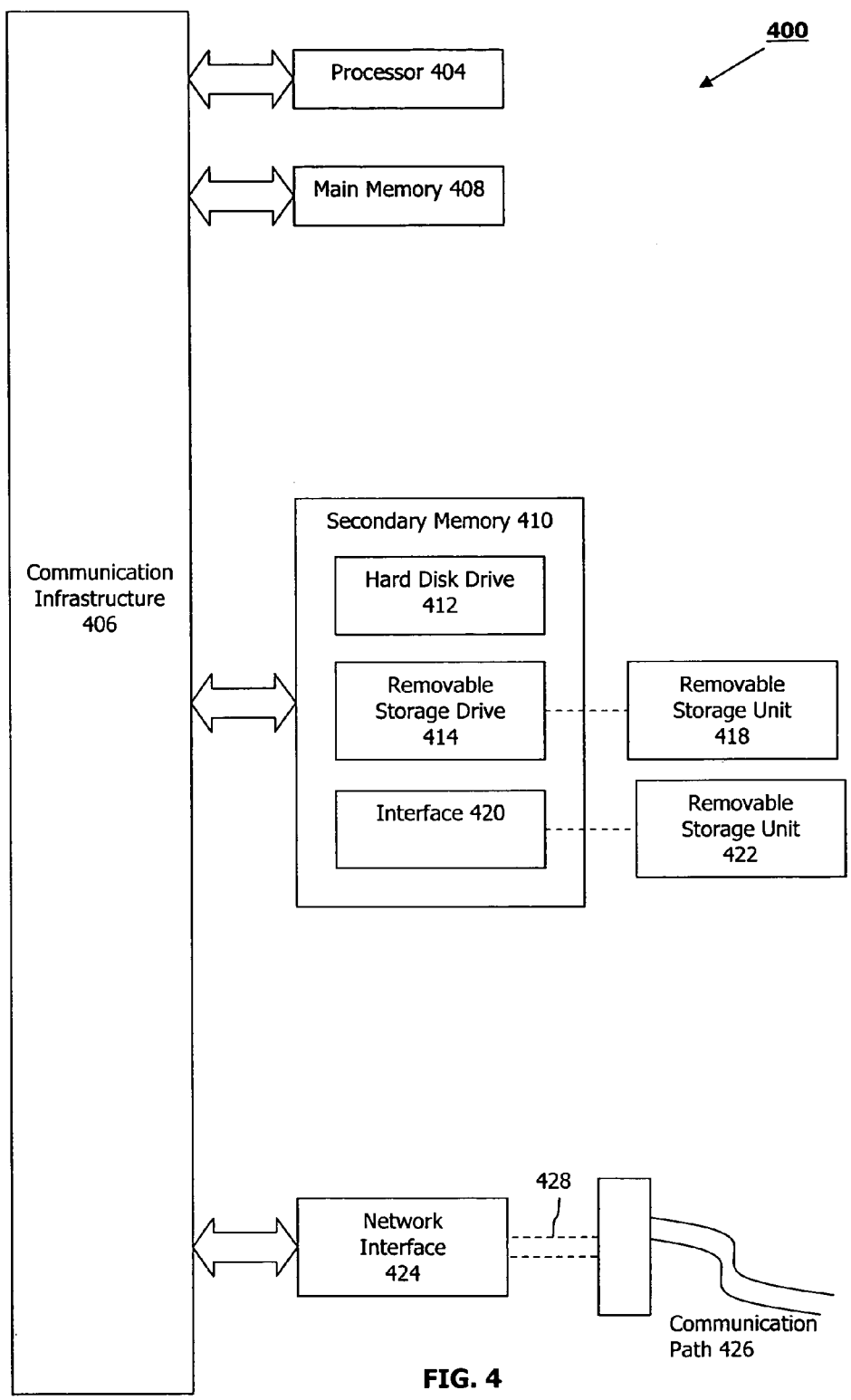
FIG. 4 is a block diagram of an exemplary computer system that may be used to implement an embodiment of the present invention.

Several aspects of the present invention can be implemented by software, firmware, hardware, or a combination thereof. FIG. 4 illustrates an example computer system 400 in which an embodiment of the present invention, or portions thereof, can be implemented as computer-readable code. For example, the methods illustrated by flowchart 100 of FIG. 1 and flowchart 300 of FIG. 3 can be implemented in system 400. Various embodiments of the invention are described in terms of this example computer system 400. After reading this description, it will become apparent to a person skilled in the relevant art how to implement the invention using other computer systems and/or computer architectures and/or combinations of other computer systems.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412 and/or a removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals 428 which may be electronic, electromagnetic, optical, or other signals capable of being received by communications interface 424. These signals 428 are provided to communications interface 424 via a communications path 426. Communications path 426 carries signals 428 and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, a hard disk installed in hard disk drive 412, and signals 428. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by flowchart 100 of FIG. 1 and flowchart 300 of FIG. 3, discussed above. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Example Capabilities and Applications

The embodiments of the present invention described herein have many capabilities and applications. The following example capabilities and applications are described below: monitoring capabilities; categorization capabilities; output, display and/or deliverable capabilities; and applications in specific industries or technologies. These examples are presented by way of illustration, and not limitation. Other capabilities and applications, as would be apparent to a person having ordinary skill in the relevant art(s) from the description contained herein, are contemplated within the scope and spirit of the present invention.

Monitoring Capabilities. As mentioned above, embodiments of the present invention can be used to facilitate monitoring of different media outlets to identify an item and/or information of interest. The item and/or information can be identified based on a similarity measure between the item and/or information and a query (such as, a user-defined query). The similarity measurement can utilization a stop word compensation algorithm in accordance with an embodiment of the present invention. By way of illustration, and not limitation, the item and/or information of interest can include, a particular brand of a good, a competitor's product, a competitor's use of a registered trademark, a technical development, a security issue or issues, and/or other types of items either tangible or intangible that may be of interest. The types of media outlets that can be monitored can include, but are not limited to, email, chat rooms, blogs, web-feeds, websites, magazines, newspapers, and other forms of media in which information is displayed, printed, published, posted and/or periodically updated.

Information gleaned from monitoring the media outlets can be used in several different ways. For instance, the information can be used to determine popular sentiment regarding a past or future event. As an example, media outlets could be monitored to track popular sentiment about a political issue. This information could be used, for example, to plan an election campaign strategy.

Categorization Capabilities. As mentioned above, stop words in a document collection can be identified in accordance with an embodiment of the present invention. The identification of these stop words can be coupled with other existing categorization techniques to improve these techniques. Example applications in which embodiments of the present invention can be coupled with categorization capabilities can include, but are not limited to, employee recruitment (for example, by matching resumes to job descriptions), customer relationship management (for example, by characterizing customer inputs and/or monitoring history), call center applications (for example, by working for the IRS to help people find tax publications that answer their questions), opinion research (for example, by categorizing answers to open-ended survey questions), dating services (for example, by matching potential couples according to a set of criteria), and similar categorization-type applications.

Output, Display and/or Deliverable Capabilities. Stop words identified in accordance with an embodiment of the present invention and/or products that use a stop word compensation algorithm in accordance with an embodiment of the present invention can be output, displayed and/or delivered in many different manners. Example outputs, displays and/or deliverable capabilities can include, but are not limited to, an alert (which could be emailed to a user), a map (which could be color coordinated), an unordered list, an ordinal list, a cardinal list, cross-lingual outputs, and/or other types of output as would be apparent to a person having ordinary skill in the relevant art(s) from reading the description contained herein.

Applications in Technology, Intellectual Property and Pharmaceuticals Industries. The stop word compensation of a document described herein can be used in several different industries, such as the Technology, Intellectual Property (IP) and Pharmaceuticals industries. Example applications of embodiments of the present invention can include, but are not limited to, prior art searches, patent/application alerting, research management (for example, by identifying patents and/or papers that are most relevant to a research project before investing in research and development), clinical trials data analysis (for example, by analyzing large amount of text generated in clinical trials), and/or similar types of industry applications.

CONCLUSION

As mentioned above, the present invention provides a method and computer program product for automatically identifying and compensating for stop words in a text processing system. The specifications and the drawings used in the foregoing description were meant for exemplary purposes only, and not limitation. It is intended that the full scope and spirit of the present invention be determined by the claims that follow.

What is claimed is:

1. A computer-based method for automatically compensating for stop words contained in documents during a query of the documents, the method comprising:

(a) generating an abstract mathematical space based on documents included in a collection of documents, wherein each document has a vector representation in the abstract mathematical space;

(b) receiving a user query;

(c) generating a vector representation of the user query in the abstract mathematical space;

(d) computing a similarity between the vector representation of the user query and the vector representation of each document, wherein computing a similarity between the vector representation of the user query and the vector representation of a first document in the collection of documents comprises applying a weighting function that compensates for stop words, wherein the weighting function is applied to only one component of the vector representation of the first document that is associated with the most frequently occurring word contained in the first document, thereby automatically compensating for a stop word contained in the first document, wherein computing the similarity between the vector representation of the user query and the vector representation of the first document comprises computing the following equation:

$$\langle d|q \rangle = \frac{1}{\|d\| \, \|q\|} \left[ w(d_1 \cdot q_1) + \sum_{i=2}^{k} d_i \cdot q_i \right],$$

wherein d is the vector representation of the first document, q is the vector representation of the user query, $\langle d|q \rangle$ is the similarity between the vector representation of the user query and the vector representation of the first document, w is the weighting function that compensates for stop words, and $d_1$ is the one component of the vector representation of the first document that is associated with the most frequently occurring word contained in the first document; and (e) displaying a result based on the similarity computations.

2. The method of claim 1, wherein applying the weighting function of step (d) comprises decreasing the one component of the vector representation of the first document by a factor of two.

3. The method of claim 1, wherein steps (a) and (c) comprise:

(a) generating a Latent Semantic Indexing (LSI) space based on documents included in a collection of documents, wherein each document has a multi-dimensional vector representation in the LSI space; and (c) generating a multi-dimensional vector representation of the user query in the LSI space.

4. A tangible computer program product for automatically compensating for stop words contained in documents during a query of the documents, the computer program product comprising:

a computer usable medium comprising a storage unit, wherein the computer usable medium has computer readable program code embodied therein for causing an application program to execute on an operating system of a computer, the computer readable program code comprising:

a computer readable first program code to enable a processor to generate an abstract mathematical space based on documents in a collection of documents, wherein each document has a vector representation in the abstract mathematical space;

a computer readable second program code to enable a processor to receive a user query;

a computer readable third program code to enable a processor to generate a vector representation of the user query in the abstract mathematical space;

a computer readable fourth program code to enable a processor to compute a similarity between the vector representation of the user query and the vector representation of each document, wherein computing a similarity between the vector representation of the user query and the vector representation of a first document in the collection of documents comprises applying a weighting function that compensates for stop words, wherein the weighting function is applied to only one component of the vector representation of the first document that is associated with the most frequently occurring word contained in the first document, thereby automatically compensating for a stop word contained in the first document, wherein the computer readable fourth program code comprises code to enable a processor to compute the following equation:

$$\langle d|q\rangle = \frac{1}{\|d\| \, \|q\|}\left[w(d_1 \cdot q_1) + \sum_{i=2}^{k} d_i \cdot q_i\right],$$

wherein d is the vector representation of the first document, q is the vector representation of the user query, $\langle d|q\rangle$ is the similarity between the vector representation of the user query and the vector representation of the first document, w is the weighting function that compensates for stop words, and $d_1$ is the one component of the vector representation of the first document that is associated with the most frequently occurring word contained in the first document; and a computer readable fifth program code to enable a processor to display a result based on the similarity computations.

5. The computer program product of claim 4, wherein the fourth computer readable program code comprises:

code to enable a processor to decrease the one component of the vector representation of the first document by a factor of two.

6. The computer program product of claim 4, wherein:

the first computer readable program code comprises code to enable a processor to generate a Latent Semantic Indexing (LSI) space based on documents in a collection of documents, wherein each document has a vector representation of the LSI space; and the third computer readable program code comprises code to enable a processor to generate a multi-dimensional vector representation of the user query in the LSI space.

7. A tangible computer program product for automatically compensating for stop words contained in documents, the computer program product comprising:

a computer usable medium comprising a storage unit, wherein the computer usable medium has computer readable program code embodied therein for causing an application program to execute on an operating system of a computer, the computer readable program code comprising:

a computer readable first program code to enable a processor to generate an abstract mathematical space based on documents in a collection of documents, wherein each document has a vector representation in the abstract mathematical space; and a computer readable second program code to enable a processor to apply a weighting function to compensate for stop words, wherein the weighting function is applied to only one component of the vector representation of each document in the collection of documents, wherein the computer readable second program code comprises code to enable a processor to apply the weighting function to a first computed dimension of the vector representation of a first document, as follows $d=(wd_1, d_2, \ldots, d_k)$ wherein d is the vector representation of the first document, w is the weighting function that compensates for stop words, and $d_1$ is the first computed dimension of the vector representation of the first document.

* * * * *